Nov. 6, 1923.
C. B. ROSE
1,472,888
TRACTOR ATTACHMENT
Filed Feb. 9, 1922
3 Sheets-Sheet 1
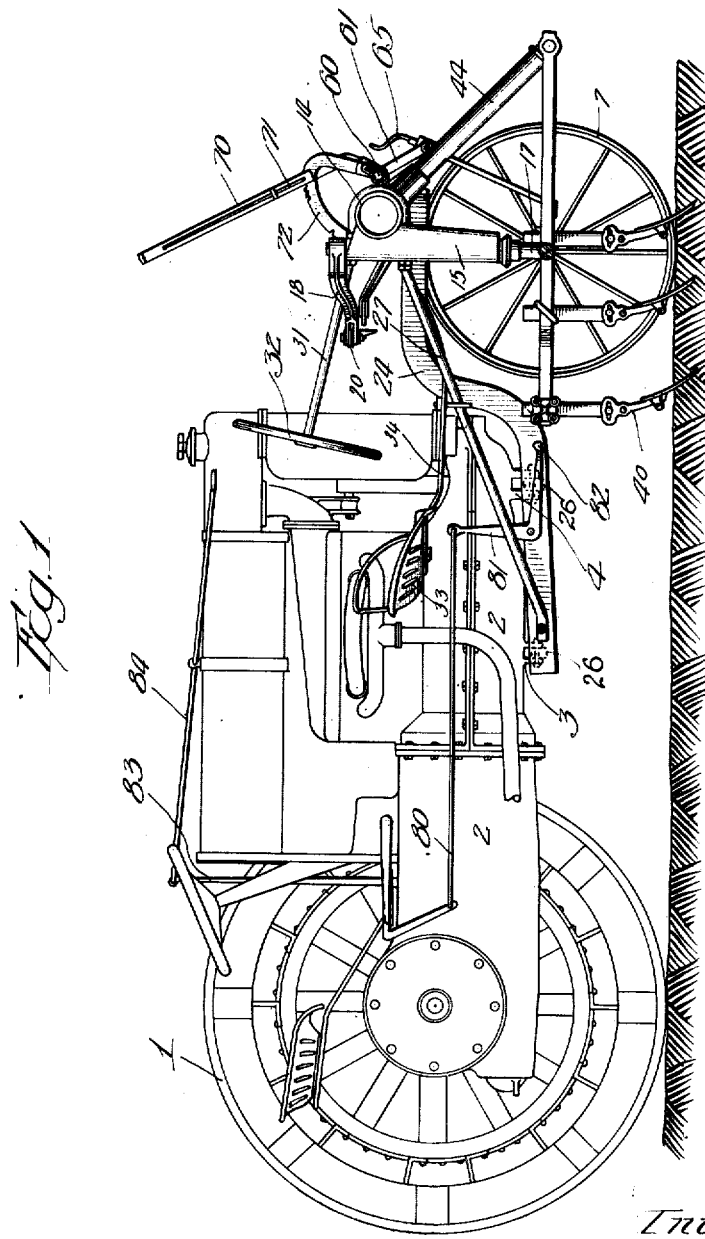
Inventor:
Charles B. Rose
L.C. Shonts  Atty

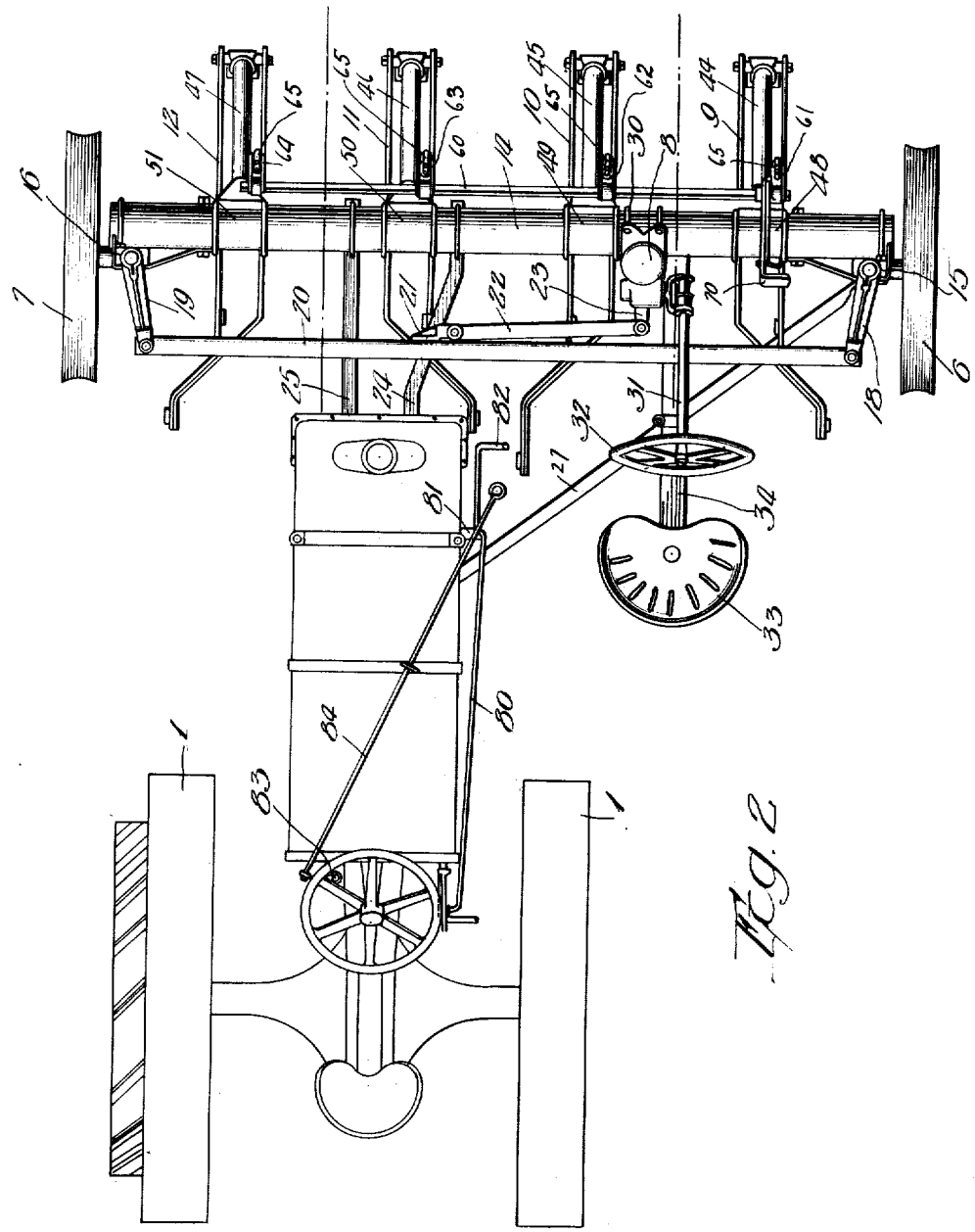

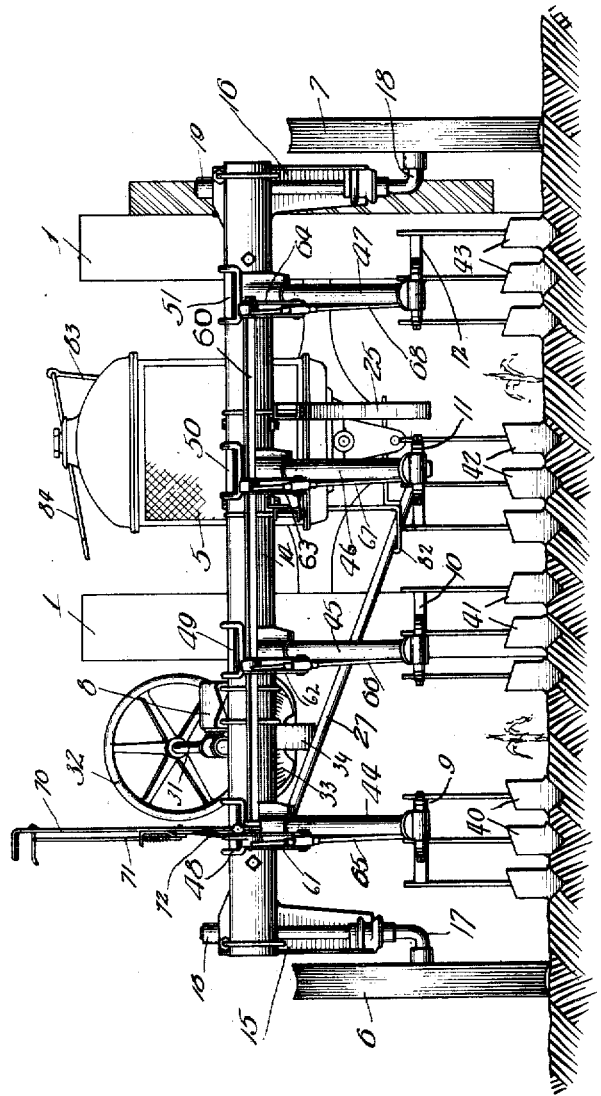

Patented Nov. 6, 1923.

1,472,888

UNITED STATES PATENT OFFICE.

CHARLES B. ROSE, OF EAST MOLINE, ILLINOIS, ASSIGNOR, BY MESNE ASSIGNMENTS, TO MOLINE PLOW COMPANY, INCORPORATED, OF MOLINE, ILLINOIS, A CORPORATION OF VIRGINIA.

TRACTOR ATTACHMENT.

Application filed February 9, 1922. Serial No. 535,123.

*To all whom it may concern:*

Be it known that I, CHARLES B. ROSE, a citizen of the United States, residing at 785 20th Ave., East Moline, county of Rock Island, State of Illinois, have invented certain new and useful Improvements in Tractor Attachments, of which the following is a specification.

The invention relates to tractor attachments.

It relates particularly to cultivator attachments adapted to be applied to tractors so that they may be used for cultivating crops such as corn or the like.

The cultivators heretofore devised for use with tractors have been arranged to be dragged behind a tractor or to be attached in some way to the rear of it. In order to guide such a cultivator, it is necessary to first steer the tractor, after which the cultivator will follow in the direction in which the tractor is guided. This method of steering is not sufficiently responsive for quick work so that it is necessary to have the drag bars supporting the cultivator shovels pivoted so that they can be swung on the cultivator frame to guide them around the crops being cultivated.

The present invention contemplates placing the cultivator frame in front of the tractor and steering the frame to guide it in cultivating, this guiding action serving also to steer the tractor. This makes the frame quickly responsive to the guiding action of the operator and avoids the necessity for swinging the drag bars relative to the frame because of inability to quickly steer it. The device has been constructed so that it may be applied to tractors as an attachment without altering their construction by substituting it for the usual fore carriage.

The general object of the invention is to provide an improved cultivator attachment for tractors.

Another object is to combine with a tractor a cultivator, the steering of which will also guide the tractor.

Another object is to provide an improved tillage implement in which the implement itself may be steered so readily that it is not necessary to swing the tillage drag bars relative to the implement frame.

Other objects and advantages of the invention will appear from the specification and drawings.

An embodiment of the invention is illustrated in the drawings in which,

Figure 1 is a side elevation of the attachment applied to a tractor.

Figure 2 is a plan view.

Figure 3 is a front elevation.

The attachment is illustrated as applied to a tractor having rear drive wheels 1 and a frame 2 with projections 3 and 4 by means of which it is ordinarily connected to the fore-carriage supporting the front tractor wheels. In using the attachment, the tractor fore-carriage is removed and the attachment substituted by connecting it to the same projections 3 and 4 to which the carriage has been connected. In this way no alteration in the tractor is required. The attachment may be connected by simply supporting the front end of the tractor, removing the tractor fore-carriage, and substituting the attachment.

The attachment includes, in general, a frame supported by wheels 6 and 7, steering means 8 for the wheels and cultivator drag bars 9, 10, 11 and 12.

The frame includes a horizontal cross number 14 with brackets 15 and 16 on its ends in which are journaled axles 17 and 18 carrying the wheels 6 and 7. Fixed to the upper ends of these axles are arms 18 and 19 connected together by a cross bar 20 to which is fixed a bracket 21. Pivoted to the bracket 21 is a link 22, the other end of which is connected to the steering arm 23 of the steering mechanism 8. Extending downwardly and rearwardly from the cross member 14 of the frame are two side bars 24 and 25, that are bent downwardly so as to extend under the front end of the tractor. These are connected under the tractor by cross braces, one of which 26, is shown in Figure 3, such braces being located so that they can be bolted to projections 3 and 4. A brace 27 is bolted to the rear end of side member 24 and extends upwardly and outwardly to the bracket 15 to which it is connected. This serves to brace the outer end of the frame.

The steering mechanism 8 is clamped on to the cross beam 14 of the frame by U-bolts 30 illustrated in Figure 2. The mechanism includes a steering worm (not shown) operated by steering shaft 31 and steering wheel 32. This worm which is of usual construction and not illustrated in detail, serves to swing the arm 23 when the steering wheel 32 is rotated. Movements of this arm are transmitted to the link 22 and bar 20 to swing the arms 18 and 19, thereby turning the axles 17 and 18 to steer the wheels 6 and 7. An operator's seat 33 is supported adjacent the steering wheel by a seat bar 34 connected to the frame.

The drag bars 9, 10, 11 and 12 carry sets of cultivator shovels 40, 41, 42 and 43 respectively and each is pivoted at its forward end to drag bar supports 44, 45, 46 and 47 respectively. Each drag bar support is clamped rigidly to the cross member 14 of the frame by clamps 48, 49, 50 and 51 respectively. The drag bars are free to swing about the transverse horizontal axes of their pivots to the drag bar supports, but cannot move laterally to any substantial extent because they are not pivoted for this purpose and because the drag bar supports are not arranged to move laterally, although they may be adjusted laterally by adjusting the clamps 48, 49, 50 and 51, thereby varying the spacing of the drag bars.

Mechanism is provided for lifting the drag bars which comprises a squared shaft 60 pivoted to the frame and provided with a plurality of arms 61, 62, 63 and 64 connected respectively to the drag bars 9, 10, 11 and 12 by links 65, 66, 67 and 68, each of which is adjustably connected to the levers 61, 62, 63, and 64 respectively by a threaded adjustment operated by handles 65. Any other suitable form of adjusting means can be employed but the above has been found simple and satisfactory. The squared shaft 60 is arranged to be rotated by a lever 70 having a latch 71 cooperating with a toothed segment 72. By pulling the lever rearwardly from the position shown in Figure 1, the squared shaft is rotated counter-clockwise swinging the arms 61, 62, 63, and 64 counter-clockwise, thereby lifting the drag bars clear of the ground, the latter pivoting about their axes to the drag bar supports 44, 45, 46 and 47. In the event it is desired to move any one drag bar relative to the other, such adjustment can be secured by manipulating the threaded adjusting means heretofore mentioned.

When operating the attachment, the operator is seated on the seat 33 from where he steers both the tractor and the cultivator by means of the wheel 32. In order that he may have control of the tractor clutch in this position, an extension has been provided comprising a link 80 connected to one end of a bell crank lever 81, the other end of which forms a foot lever 82 in convenient position to be manipulated by the operator. An extension 83 is placed on the gear shift lever and made operable by a rod 84 extending over the top of the tractor in a convenient position for the operator. The throttle is on the side of the tractor adjacent the operator so that it is not necessary to provide any extension for operating it although a lever may be placed on it for convenience, if desired.

In this way the operator has complete control of the tractor and is in a position where he has a clear view of his work as well as ready and instantly responsive control of the tractor. When the cultivator shovels are raised for transportation, the tractor can be guided over the ground the same as when driven from the usual tractor operator's position. When the cultivator shovels are in working position, the tractor is under complete control of the operator and its forward end with the cultivator shovels may be steered quickly to the right or left to guide the shovels adjacent the corn rows.

The cultivator attachment is made to cultivate two rows of corn simultaneously, the two middle sets of shovels being between two rows and the outer shovels being on the outside of each of the rows. The tractor wheels straddle one of the rows as illustrated in Figure 3.

It has been found that this attachment when applied to a tractor can be steered very easily. It is so quickly responsive to movements of the steering wheel, that it is not necessary to shift the drag bars independently of the cultivator frame. This relieves the operator of considerable work that has heretofore been thought necessary, that is, he has been required to steer the cultivator drag bars with his feet and to steer the tractor with his hands and then manipulate whatever controls it may be necessary to operate from time to time in the control of the tractor. By eliminating the necessity for shifting the drag bar supports, the operator may use one foot for controlling the clutch of the tractor, he may steer the tractor and do his cultivating by means of the steering wheel, and he has sufficient time to manipulate the other devices, none of which need be manipulated while the tractor is in motion except the throttle which can be easily reached with one hand, while the other is steering the tractor and the lever for raising the drag bars which can be pulled back with one hand because at the time it is raised, attention to steering need not be so close.

This type of cultivator, that is, a cultivator guided by a steering wheel and having drag bars which are movable with the frame is a distinct departure in the art of cultivating, which simplifies cultivating apparatus, thereby lessening the cost and at the same time making the machine easier to operate.

An important advantage of the invention is that it may be quickly applied to an attachment to a tractor, thus converting the tractor into a cultivator. When the cultivating work is completed the attachment may be as quickly removed, leaving the tractor in its original condition for other uses.

It is to be understood that the structure shown is for purposes of illustration only and that variations may be made therein without departing from the spirit and scope of the invention as defined by the claims.

I claim:

1. An attachment adapted to be applied to tractors, having rear drive wheels and a fore carriage without changing their construction, comprising a wheeled frame serving to act as a substitute for the fore-carriage of a tractor, means for steering the wheels, and tillage implements carried by the frame.

2. An attachment for tractors, having rear drive wheels and a fore carriage comprising a wheeled frame adapted to be attached to a tractor in place of the usual fore-carriage, means for steering the wheels, and tillage implements carried by the frame movable up and down in a vertical plane, but held against lateral movement relative to the frame.

3. A tillage attachment adapted to be applied to tractors, having rear drive wheels and a fore carriage without changing their construction comprising a wheeled frame serving to act as a substitute for the fore-carriage of a tractor, means for steering the wheels of the frame, drag bar supports rigidly attached to the frame, and drag bars carrying tillage implements pivoted to the drag bars to swing in a vertical plane.

4. A tillage attachment for tractors adapted to be applied to tractors without changing their construction comprising a wheeled frame serving to act as a substitute for the fore-carriage of a tractor, means for steering the wheels of the frame, and tillage implements rigidly connected to the frame so as to move with it as it is steered.

5. A tillage attachment adapted to be applied to tractors without altering their construction composed of a cross member having axles carrying supporting wheels journaled near its ends and a rearwardly extending portion adapted to be connected to the under side of a tractor, steering means carried by the frame for steering the wheels, drag bar supports rigidly fixed to the frame and extending forwardly and downwardly, and drag bars carrying tillage implements pivoted to the drag bar supports.

6. A two-row cultivator attachment for tractors comprising a wheeled frame adapted to be substituted for the usual fore-carriage of a tractor, steering means for guiding the wheels of the frame, drag bar supports rigidly attached to the frame, drag bars carrying tillage tools pivoted to the drag bar supports, and means for raising the drag bars.

7. A two-row cultivator attachment adapted to be applied to tractors without altering their construction comprising a wheeled frame serving to act as a substitute for the fore-carriage of a tractor and to be connected in offset relation with the center line of the tractor, steering means on the frame for guiding the wheels, an operator's seat positioned to the rear so that the operator is at the side of the tractor in convenient position to manipulate controls, and tillage tools carried by the frame and movable therewith so that, when the steering means is operated, the attachment with its tillage tools is quickly guided in the desired direction.

8. A tillage attachment for tractors of the type having rear drive wheels and a fore carriage, comprising a wheeled frame adapted to be substituted for the fore carriage of a tractor without altering the tractor construction, steering means for guiding the wheels of the frame operable from a position adjacent the front of a tractor, tillage tools carried by the wheeled frame, and an operator's seat supported by the frame adjacent the steering means.

9. A tillage attachment for Fordson tractors comprising a wheeled frame adapted to be substituted for the fore carriage of a Fordson without altering the tractor construction, steering means for guiding the wheels of the frame operable from a position at one side and near the front end of a Fordson, tillage tools carried by the frame, and an operator's seat supported by the wheeled frame so that it will be at one side and adjacent the front end of a Fordson to enable an operator to steer the wheeled frame, to watch the work being done by the tillage tools, and to manipulate the tractor controls.

In testimony whereof, I affix my signature.

CHARLES B. ROSE.

DISCLAIMER.

1,472,888.—*Charles B. Rose*, East Moline, Ill. TRACTOR ATTACHMENT. Patent dated November 6, 1923. Disclaimer filed May 25, 1927, by the assignee by mesne assignments, *Moline Implement Company*.

Disclaimer is entered as to claims 1, 2, 3, 4, and 5, except when said claims are construed to give to the word "tillage" in line 1 of claims 3, 4, and 5 the meaning of cultivator and except where the expression "tillage implements" in claims 1, 2, 3, 4, and 5 is given the meaning of cultivator shovels such as shown and described in said Patent No. 1,472,888 and their equivalent.

This disclaimer correcting name of assignee supersedes disclaimer published July 26, 1927.